US012645585B2

(12) United States Patent
Xu et al.

(10) Patent No.: US 12,645,585 B2
(45) Date of Patent: Jun. 2, 2026

(54) STORAGE NODE CONFIGURATION APPARATUS AND METHOD FOR EFFICIENT BURST ACCESS HANDLING

(71) Applicant: Huawei Cloud Computing Technologies Co., Ltd., Guizhou (CN)

(72) Inventors: Jie Xu, Gui'an (CN); Zhou Yu, Shenzhen (CN); Jea Woong Hyun, Gui'an (CN); Jianhua Zhou, Chengdu (CN); Lv Chen, Shenzhen (CN)

(73) Assignee: HUAWEI CLOUD COMPUTING TECHNOLOGIES CO., LTD., Guizhou (CN)

( * ) Notice: Subject to any disclaimer, the term of this patent is extended or adjusted under 35 U.S.C. 154(b) by 0 days.

(21) Appl. No.: 18/759,328

(22) Filed: Jun. 28, 2024

(65) Prior Publication Data

US 2024/0354247 A1 Oct. 24, 2024

Related U.S. Application Data

(63) Continuation of application No. PCT/CN2022/123763, filed on Oct. 8, 2022.

(30) Foreign Application Priority Data

Dec. 31, 2021 (CN) .......................... 202111679415.2

(51) Int. Cl.
*G06F 12/02* (2006.01)

(52) U.S. Cl.
CPC .. *G06F 12/0253* (2013.01); *G06F 2212/7205* (2013.01)

(58) Field of Classification Search
CPC ......... G06F 12/0253; G06F 2212/7205; G06F 3/0604; G06F 3/061; G06F 3/0629; G06F 3/067; G06F 3/0679
See application file for complete search history.

(56) References Cited

U.S. PATENT DOCUMENTS

| | | | |
|---|---|---|---|
| 2020/0245233 A1* | 7/2020 | Qian | .................... H04W 48/18 |
| 2021/0109584 A1 | 4/2021 | Bernat et al. | |

FOREIGN PATENT DOCUMENTS

| | | |
|---|---|---|
| CN | 111078588 A | 4/2020 |
| CN | 111131516 A | 5/2020 |

* cited by examiner

*Primary Examiner* — Jane W Benner
(74) *Attorney, Agent, or Firm* — Conley Rose, P.C.

(57) ABSTRACT

A storage node configuration method includes obtaining service requirement information, where the service requirement information includes a burst access moment, a burst access bandwidth, or burst access duration of a computing node for a storage node; determining target configuration information based on the service requirement information, where the target configuration information is used to configure a peak bandwidth and peak bandwidth duration that are of the storage node; and sending the target configuration information to the storage node.

20 Claims, 5 Drawing Sheets

```
┌──────────────┐
│  Management  │
│     node     │
└──────────────┘
        │
┌───────────────────────────────────┐
│ 201: Obtain service requirement    │
│ information, where the service     │
│ requirement information includes   │
│ a burst access moment, a burst     │
│ access bandwidth, or burst access  │
│ duration of a computing node for   │
│ the storage node                   │
└───────────────────────────────────┘
        │
┌───────────────────────────────────┐
│ 202: Determine target configuration│
│ information based on the service   │
│ requirement information, where the │
│ target configuration information   │
│ is used to configure a peak        │
│ bandwidth and peak bandwidth       │
│ duration that are of the storage   │
│ node                               │
└───────────────────────────────────┘
```

┌──────────────┐
│ Storage node │
└──────────────┘

203: Send the target configuration information to the storage node

204: Configure the storage node based on the target configuration information

STORAGE NODE CONFIGURATION APPARATUS AND METHOD FOR EFFICIENT BURST ACCESS HANDLING

CROSS-REFERENCE TO RELATED APPLICATIONS

This is a continuation of International Patent Application No. PCT/CN2022/123763 filed on Oct. 8, 2022, which claims priority to Chinese Patent Application No. 202111679415.2 filed on Dec. 31, 2021, which are hereby incorporated by reference in their entireties.

TECHNICAL FIELD

Embodiments of this disclosure relate to the computer field, and in particular, to a storage node configuration method and a related apparatus.

BACKGROUND

A block storage service is a cloud storage service provided by a cloud service vendor. The block storage service may provide a tenant with a highly reliable and elastically scalable cloud storage. In the block storage service, distributed storage software is usually deployed on a plurality of storage nodes. The distributed storage software virtualizes storage hardware into a storage pool. Virtual cloud storage disks of different specifications can be obtained through division in the storage pool. Each storage node is provided with a large quantity of high-performance and large-capacity solid-state drives (SSDs).

Because an access bandwidth that can be provided by each storage node is limited, when a burst access bandwidth exceeds a maximum access bandwidth of the storage pool, a latency of accessing the cloud storage by the tenant is increased, and the storage node limits the burst access bandwidth. Currently, to cope with burst access of a tenant, a high-speed storage medium is added to a storage node and is used as a cache to absorb a burst access bandwidth of the tenant. However, adding the high-speed storage medium to the storage node increases costs of the storage node, and causes a waste of storage resources when there is no burst access of the tenant.

SUMMARY

Embodiments of this disclosure provide a storage node configuration method and a related apparatus, to reduce costs of coping with burst access by a storage node.

An embodiment of this disclosure provides a storage node configuration method. The method may be performed by a management node, or may be performed by a component of the management node, for example, a processor, a chip, or a chip system of the management node, or may be implemented by a logical module or software that can implement all or some functions of the management node. For example, the method is performed by the management node. The configuration method provided in this embodiment of this disclosure includes: The management node obtains service requirement information. The service requirement information includes a burst access moment, a burst access bandwidth, or burst access duration of a computing node for a storage node in a future period of time. The management node determines target configuration information based on the service requirement information. The target configuration information is used to configure a peak bandwidth and peak bandwidth duration that are of the storage node. The peak bandwidth and the peak bandwidth duration match the burst access moment, the burst access bandwidth, or the burst access duration of the computing node for the storage node. That is, the storage node configured based on the target configuration information can absorb the burst access bandwidth of the computing node for the storage node. The management node sends the target configuration information to the storage node.

In this embodiment of this disclosure, the management node can obtain a service access requirement of the computing node for the storage node, where the service access requirement includes the burst access moment, the burst access bandwidth, or the burst access duration, and determine configuration information of the storage node based on the service access requirement, so that the storage node can increase the peak bandwidth and absorb the burst access bandwidth when the burst access moment is reached. In this way, a capability of coping with the burst access by the storage node is improved. In addition, no new storage medium is added to the storage node to absorb the burst access bandwidth. In comparison with another technology, costs of coping with the burst access by the storage node are reduced, and storage resources are saved.

In a possible implementation, the target configuration information includes one or more of the following information: a garbage collection (GC) waterline level, a power consumption level, and a voltage level. A garbage collection waterline indicates an amount of data on which garbage collection is performed. Configuring the GC waterline level of the storage node enables the storage node to perform garbage collection before the burst access moment, so that the garbage collection does not occupy an access bandwidth after the burst access moment arrives. Configuring the power consumption level of the storage node enables the storage node to break through a power consumption limit in short time, so that the peak bandwidth of the storage node is increased in short time to absorb the burst access bandwidth. The voltage level of the storage node is configured. For example, a writing voltage level of the storage node is configured, to increase a writing voltage, so that a write bandwidth of the computing node in the storage node is increased. In this embodiment of this disclosure, the storage node includes one or more solid-state drives SSDs. Configuring the GC waterline level, the power consumption level, or the voltage level of the storage node may be configuring a GC waterline level, a power consumption level, or a voltage level of the one or more SSDs in the storage node.

In this embodiment of this disclosure, the management node can configure the peak bandwidth and the peak bandwidth duration that are of the storage node in a plurality of configuration manners. This improves implementability of a configuration solution.

In a possible implementation, in a process in which the management node obtains the service requirement information, the management node receives the service requirement information sent by the computing node, in other words, the computing node can send information such as the burst access moment, the burst access bandwidth, and the burst access duration to the management node in advance. Alternatively, the management node determines a prediction value of the service requirement information based on historical access information of the computing node for the storage node. The historical access information includes a historical burst access moment, a historical burst access bandwidth, and historical burst access duration of the computing node for the storage node. The management node can predict the service requirement information based on the historical access information.

In this embodiment of this disclosure, the management node can obtain the service requirement information in a plurality of manners, including a manner of directly obtaining the service requirement information from the computing node and a manner of predicting the service requirement information by using the historical access information. This improves diversity of manners of obtaining the service requirement information in the solution.

In a possible implementation, after the management node sends the target configuration information to the storage node, the target configuration information is successfully configured on the storage node, and timing of preparation time starts. When the storage node reaches the burst access moment, the management node sends a query instruction to the storage node. The query instruction is used to query whether the storage node reaches a preparation completion moment, the preparation completion moment is determined based on the burst access moment and preparation time, and the preparation time is time needed for an access bandwidth of the storage node to reach the peak bandwidth. When the storage node reaches the preparation completion moment, an acceleration state command is sent to the storage node. The acceleration state command is used to enable the peak bandwidth on the storage node.

In this embodiment of this disclosure, before sending the acceleration state command to the storage node, the management node first sends the query instruction to query whether preparation of the storage node is completed. This improves reliability of accelerating the storage node to reach the peak bandwidth.

In a possible implementation, after the management node sends the acceleration state command to the storage node, the management node monitors the access bandwidth of the storage node. The management node sends an acceleration state exit command to the storage node when the access bandwidth is less than a threshold or the peak bandwidth duration is reached. The acceleration state exit command is used to restore the peak bandwidth to a normal bandwidth on the storage node.

In this embodiment of this disclosure, the management node monitors the access bandwidth of the storage node in real time, and the storage node exits an acceleration state due to a plurality of trigger conditions, including: The burst access bandwidth is less than a threshold or the peak bandwidth duration is reached. In this way, the storage node can exit the acceleration state in time. This avoids a waste of peak bandwidth resources. In addition, a service life of the storage node is not affected.

In a possible implementation, in a process in which the management node determines the target configuration information based on the service requirement information, the management node determines a target peak bandwidth and target peak bandwidth duration from a configuration table based on the service requirement information. The configuration table includes peak bandwidths, peak bandwidth duration, or preparation time that corresponds to different configurations of the storage node. The management node determines the target configuration information based on the target peak bandwidth and the target peak bandwidth duration, that is, selects a corresponding GC waterline level, power consumption level, and voltage level based on the target peak bandwidth and the target peak bandwidth duration.

In this embodiment of this disclosure, the management node can directly select a corresponding peak bandwidth and corresponding peak bandwidth duration from the configuration table based on the service requirement information. This improves task configuration efficiency.

A second aspect of embodiments of this disclosure provides a storage node configuration method. The method may be performed by a storage node, or may be performed by a component of the storage node, for example, a processor, a chip, or a chip system of the storage node, or may be implemented by a logical module or software that can implement all or some functions of the storage node. For example, the method is performed by the storage node. The configuration method provided in this embodiment of this disclosure includes: The storage node receives target configuration information sent by a management node. The target configuration information is used to configure a peak bandwidth and peak bandwidth duration that are of the storage node. The storage node configures the storage node based on the target configuration information, to enable the storage node to process burst access of a computing node to the storage node.

In this embodiment of this disclosure, the management node can obtain a service access requirement of the computing node for the storage node, and determine configuration information of the storage node based on the service access requirement, so that the storage node can absorb a burst access bandwidth when the burst access moment is reached. In this way, a capability of coping with the burst access by the storage node is improved. In addition, no storage medium is added to the storage node to absorb the burst access bandwidth, so that storage resources are saved.

In a possible implementation, the target configuration information includes one or more of the following information: a GC waterline level, a power consumption level, and a voltage level. Configuring the GC waterline level of the storage node enables the storage node to perform garbage collection before the burst access moment, so that the garbage collection does not occupy an access bandwidth after the burst access moment arrives. Configuring the power consumption level of the storage node enables the storage node to break through a power consumption limit in short time, so that the peak bandwidth of the storage node is increased in short time to absorb the burst access bandwidth. The voltage level of the storage node is configured. For example, a writing voltage level of the storage node is configured, to increase a writing voltage, so that a write bandwidth of the computing node in the storage node is increased.

In this embodiment of this disclosure, the peak bandwidth and the peak bandwidth duration that are of the storage node can be configured in a plurality of configuration manners. This improves implementability of a configuration solution.

In a possible implementation, the storage node receives a query instruction sent by the management node. The query instruction is used to query whether the storage node reaches a preparation completion moment, the preparation completion moment is determined based on the burst access moment and preparation time, and the preparation time is time needed for an access bandwidth of the storage node to reach the peak bandwidth. If the storage node reaches the preparation completion moment, the storage node sends a query instruction response to the management node. The query instruction response indicates that preparation of the storage node is completed within the preparation time corresponding to the target configuration information.

In this embodiment of this disclosure, the query instruction sent by the management node is received, and the query instruction response is sent to the management node. The query instruction response can indicate whether preparation of the storage node is completed. This improves reliability of accelerating the storage node to reach the peak bandwidth.

In a possible implementation, the storage node receives an acceleration state command sent by the management node. The acceleration state command is used to enable the peak bandwidth on the storage node, this means, the acceleration state command enables the peak bandwidth and the peak bandwidth duration that correspond to the target configuration information to continuously take effect.

In this embodiment of this disclosure, the storage node increases the access bandwidth to the peak bandwidth only after receiving the acceleration state command sent by the management node. This avoids a waste of peak bandwidth resources.

In a possible implementation, in a process of configuring the storage node based on the target configuration information, the storage node configures the GC waterline level of the storage node based on the target configuration information, and increases a bandwidth that is used by the storage node to perform garbage processing before a burst access moment In this embodiment of this disclosure, configuring the GC waterline level of the storage node enables the storage node to perform garbage collection before the burst access moment, so that the garbage collection does not occupy an access bandwidth after the burst access moment arrives. This increases a bandwidth resource for processing burst access when the burst access moment is reached.

In a possible implementation, in the process of configuring the storage node based on target configuration information, the storage node configures the power consumption level of the storage node based on the target configuration information, to enable a power consumption threshold of the storage node to increase, thereby increasing a bandwidth of the storage node.

In this embodiment of this disclosure, configuring the power consumption level of the storage node enables the storage node to break through a power consumption limit in short time, so that the peak bandwidth of the storage node is increased in short time to absorb the burst access bandwidth and a capability of coping with the burst access by the storage node is improved.

In a possible implementation, in the process of configuring the storage node based on the target configuration information, the storage node configures the voltage level of the storage node based on the target configuration information, to enable a voltage threshold of the storage node to increase, thereby increasing the bandwidth of the storage node.

In this embodiment of this disclosure, the voltage level of the storage node is configured, to increase an access bandwidth of the storage node. This improves the capability of coping with the burst access by the storage node.

A third aspect of embodiments of this disclosure provides a management node. The management node includes a transceiver unit and a processing unit. The transceiver unit is configured to obtain service requirement information. The service requirement information includes a burst access moment, a burst access bandwidth, or burst access duration of a computing node for a storage node. The processing unit is configured to determine target configuration information based on the service requirement information. The target configuration information is used to configure a peak bandwidth and peak bandwidth duration that are of the storage node. The transceiver unit is further configured to send the target configuration information to the storage node.

In a possible implementation, the target configuration information includes one or more of the following information: a GC waterline level, a power consumption level, and a voltage level.

In a possible implementation, the transceiver unit is configured to receive the service requirement information sent by the computing node. Alternatively, the processing unit is further configured to determine a prediction value of the service requirement information based on historical access information of the computing node for the storage node.

In a possible implementation, the transceiver unit is further configured to send a query instruction to the storage node when the burst access moment is reached. The query instruction is used to query whether the storage node reaches a preparation completion moment, the preparation completion moment is determined based on the burst access moment and preparation time, and the preparation time is time needed for an access bandwidth of the storage node to reach the peak bandwidth. The transceiver unit is further configured to send an acceleration state command to the storage node when the storage node reaches the preparation completion moment. The acceleration state command is used to enable the peak bandwidth on the storage node.

In a possible implementation, the processing unit is further configured to monitor the access bandwidth of the storage node. The transceiver unit is further configured to send an acceleration state exit command to the storage node when the access bandwidth is less than a threshold or the peak bandwidth duration is reached. The acceleration state exit command is used to restore the peak bandwidth to a normal bandwidth on the storage node.

In a possible implementation, the processing unit is configured to determine a target peak bandwidth and target peak bandwidth duration from a configuration table based on the service requirement information. The configuration table includes peak bandwidths, peak bandwidth duration, or preparation time that corresponds to different configurations of the storage node. The processing unit is configured to determine the target configuration information based on the target peak bandwidth and the target peak bandwidth duration.

A fourth aspect of embodiments of this disclosure provides a storage node. The storage node includes a transceiver unit and a processing unit. The transceiver unit is configured to receive target configuration information sent by a management node. The target configuration information is used to configure a peak bandwidth and peak bandwidth duration that are of the storage node. The processing unit is adapted to configure the storage node based on the target configuration information, to enable the storage node to process burst access of a computing node to the storage node.

In a possible implementation, the target configuration information includes one or more of the following information: a GC waterline level, a power consumption level, and a voltage level.

In a possible implementation, the transceiver unit is further configured to receive an acceleration state command sent by the management node. The acceleration state command is used to enable the peak bandwidth on the storage node.

In a possible implementation, the processing unit is adapted to configure a GC waterline level of an SSD in the storage node based on the target configuration information, and increase a bandwidth that is used by the storage node to perform garbage processing before a burst access moment.

In a possible implementation, the processing unit is adapted to configure a power consumption level of the SSD in the storage node based on the target configuration information, to enable a power consumption threshold of the storage node to increase, thereby increasing a bandwidth of the storage node.

In a possible implementation, the processing unit is adapted to configure a voltage level of the SSD in the storage node based on the target configuration information, to enable a voltage threshold of the storage node to increase, thereby increasing the bandwidth of the storage node.

A fifth aspect of embodiments of this disclosure provides a storage node configuration system. The configuration system includes a management node and a storage node. The management node is configured to perform the method according to any one of the first aspect or the possible implementations of the first aspect. The storage node is configured to perform the method according to any one of the second aspect or the possible implementations of the second aspect.

A sixth aspect of embodiments of this disclosure provides a configuration device, including a processor. The processor is coupled to a memory, and the memory is configured to store instructions. When the instructions are executed by the processor, the configuration device is enabled to perform the method according to any one of the first aspect or the possible implementations of the first aspect, or the configuration device is enabled to perform the method according to any one of the second aspect or the possible implementations of the second aspect.

A seventh aspect of embodiments of this disclosure provides a computer-readable storage medium, storing instructions. When the instructions are executed, a computer is enabled to perform the method according to any one of the first aspect or the possible implementations of the first aspect, or the computer is enabled to perform the method according to any one of the second aspect or the possible implementations of the second aspect.

An eighth aspect of embodiments of this disclosure provides a computer program product, including instructions. When the instructions are executed, a computer is enabled to implement the method according to any one of the first aspect or the possible implementations of the first aspect, or the computer is enabled to implement the method according to any one of the second aspect or the possible implementations of the second aspect.

It may be understood that for beneficial effects that can be achieved by any one of the management node, the storage node, the configuration system, the configuration device, the computer-readable medium, the computer program product, or the like, refer to the beneficial effects in a corresponding method. Details are not described herein again.

DESCRIPTION OF EMBODIMENTS

Figure 1:
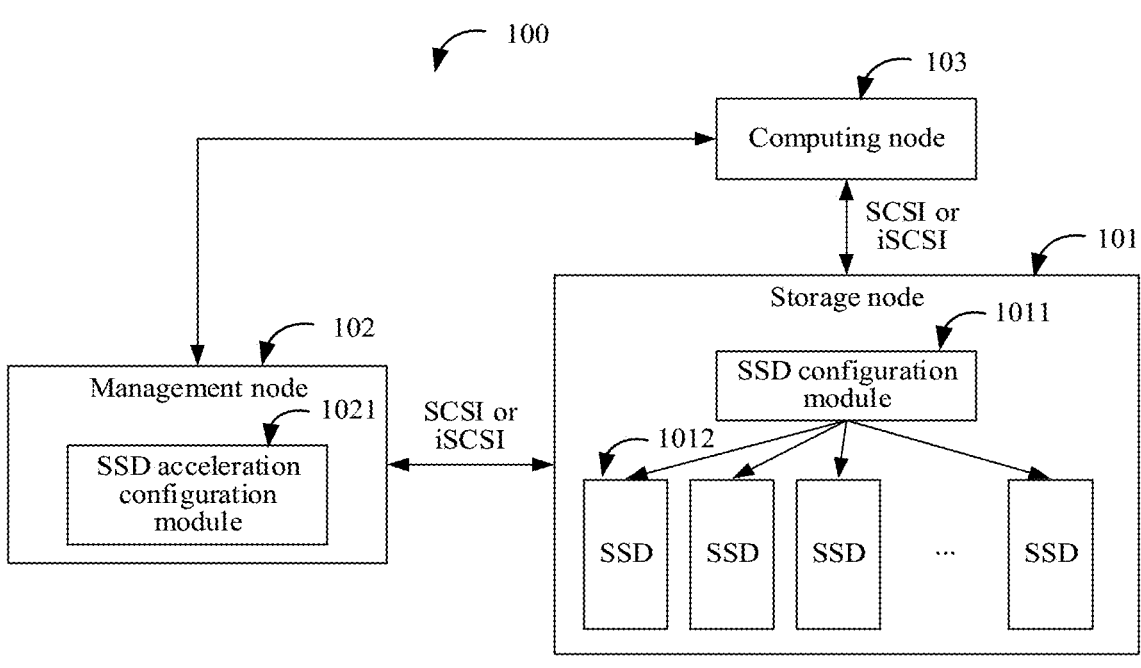
FIG. 1 is a diagram of a system architecture of a storage system according to an embodiment of this disclosure.

Embodiments of this disclosure provide a task scheduling method and a task scheduling apparatus, to improve task scheduling efficiency.

In the specification, claims, and accompanying drawings of this disclosure, the terms "first", "second", "third", "fourth", and the like (if existent) are intended to distinguish between similar objects but do not necessarily indicate an order or sequence. It should be understood that the data termed in such a way are interchangeable in proper circumstances so that embodiments described herein can be implemented in other orders than the order illustrated or described herein. In addition, the terms "include" and "have" and any other variants are intended to cover the non-exclusive inclusion. For example, a process, method, system, product, or device that includes a list of steps or units is not necessarily limited to those expressly listed steps or units, but may include other steps or units not expressly listed or inherent to such a process, method, product, or device.

In addition, in embodiments of this disclosure, the word "exemplary" or "for example" is used to represent giving an example, an illustration, or a description. Any embodiment or design scheme described as an "example" or "for example" in embodiments of this disclosure should not be explained as being more preferred or having more advantages than another embodiment or design scheme. Exactly, use of the word "example", "for example", or the like is intended to present a related concept in a manner.

In the following, some terms in this disclosure are described, to help a person skilled in the art have a better understanding.

GC means that for allocated memory space, when a program no longer needs to use the memory space, an object needs to be destroyed and a memory resource occupied by the program needs to be released, so that the memory space can be reused.

SSD is a hard disk made of a solid-state electronic storage chip array. There are two types of storage media of the solid-state disk. One type is that a flash memory (flash) is used as a storage medium. The other type is that a dynamic random-access memory (DRAM) is used as a storage medium.

A small computer system interface (SCSI) is a system-level interface standard used between a computer and a peripheral device of the computer. The peripheral device includes a hard disk, a floppy drive, an optical disc drive, a printer, a scanner, or the like. A hard disk that uses the SCSI is also referred to as an SCSI hard disk.

An internet small computer system interface (iSCSI) is a storage technology that is based on the internet and an SCSI protocol. The SCSI protocol originally used only for a local computer is sent through a network, so that a connected distance can be extended infinitely in area.

The foregoing describes some terms in embodiments of this disclosure. The following describes a storage node configuration method and a related apparatus in embodiments of this disclosure with reference to the accompanying drawings.

FIG. 1 is a diagram of a system architecture of a storage system according to an embodiment of this disclosure. As shown in FIG. 1, the storage system 100 includes a storage node 101, a management node 102, and a computing node 103. The storage node 101 includes a solid-state disk SSD configuration module 1011 and one or more SSDs 1012. The SSD configuration module 1011 is adapted to configure a peak bandwidth and peak duration of the one or more SSDs 1012 based on configuration information sent by the management node 102. Specific content of the configuration information includes a GC waterline level, a power consumption level, or a voltage level In the storage system 100, a plurality of SSDs 1012 are virtualized into a storage pool through distributed software. The storage pool may be divided into virtual cloud disks having different capacities, and the virtual cloud disks are provided for the computing node 103 for use. Specifically, an application of a tenant is deployed on the computing node 103. The application of the tenant uses a virtual cloud disk as a data disk or a system disk.

The management node 102 is configured to manage processes in the storage node 101 and the computing node 103, and provide functions such as alarm, monitoring, logging, or configuration. The management node 102 includes an SSD acceleration configuration module 1021. The SSD acceleration configuration module 1021 is configured to determine configuration information of the storage node 101 based on service requirement information. The management node 102 communicates with the storage node 101 through a small computer system interface SCSI or an internet small computer system interface iSCSI.

In this embodiment of this disclosure, the storage node 101, the management node 102, and the computing node 103 may be separately deployed on different physical devices. The management node 102 may alternatively be deployed on a virtual machine. This is not limited.

In a possible system architecture in this embodiment of this disclosure, the storage node 101 and the management node 102 may alternatively be integrated into a same device. When the storage node 101 and the management node 102 are integrated into the same device, the device may implement functions of the storage node 101 and the management node 102 based on an integrated hardware module.

Figure 2:
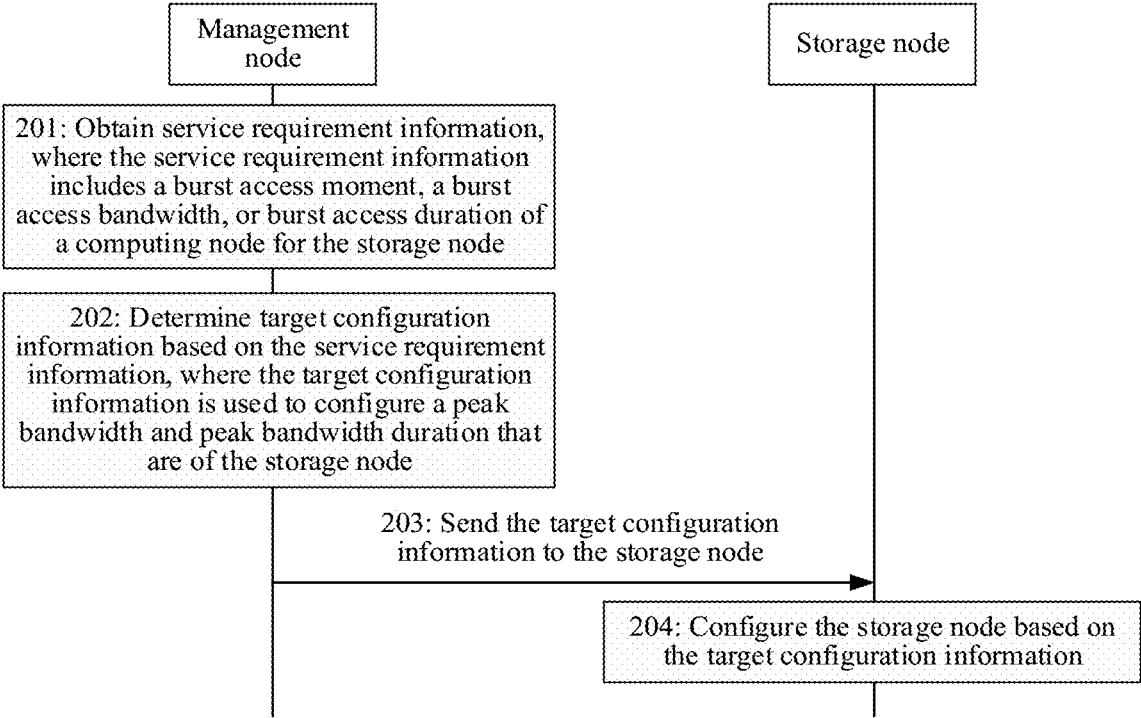
FIG. 2 is a diagram of a storage node configuration method according to an embodiment of this disclosure.

FIG. 2 is a schematic flowchart of a storage node configuration method according to an embodiment of this disclosure. As shown in FIG. 2, the storage node configuration method according to this embodiment of this disclosure includes the following steps.

201: A management node obtains service requirement information, where the service requirement information includes a burst access moment, a burst access bandwidth, or burst access duration of a computing node for a storage node.

The management node obtains the service requirement information. The service requirement information includes the burst access moment, the burst access bandwidth, or the burst access duration of the computing node for the storage node. The service requirement information may be a plurality of burst access moments, burst access bandwidths, and burst access duration for the storage node in a future period of time. For example, the storage node has two times of burst access in a period of time from 12:00 to 18:00 on the next day. The two times of burst access respectively correspond to different burst access moments, burst access bandwidths, and burst access duration.

In this embodiment of this disclosure, the management node may obtain the service requirement information in a plurality of manners. For example, the management node may receive the service requirement information sent by the computing node. Alternatively, the management node obtains the service requirement information of the computing node by performing data mining on the computing node. Alternatively, the management node obtains a prediction value of the service requirement information based on historical access information of the computing node for the storage node. Specifically, the management node predicts the burst access moment, the burst access bandwidth, and the burst access duration based on a historical burst access moment, a historical burst access bandwidth, and historical burst access duration.

It may be understood that in this embodiment of this disclosure, the burst access includes burst write and burst read. Unless otherwise specified, the burst access in this embodiment of this disclosure is described by using the burst write as an example.

Figure 3:
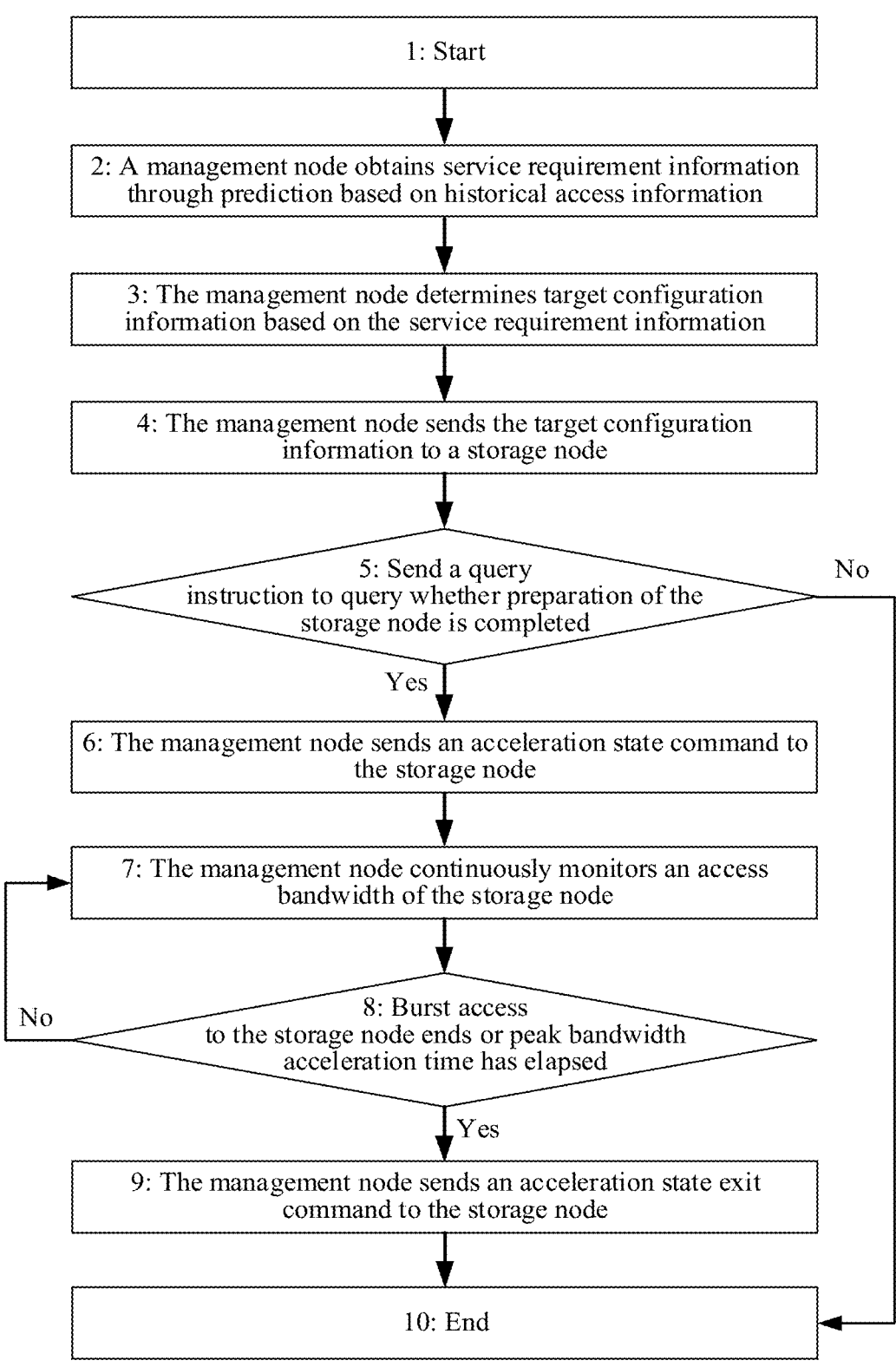
FIG. 3 is a schematic flowchart of a storage node configuration method according to an embodiment of this disclosure.

FIG. 3 is a schematic flowchart of a storage node configuration method according to an embodiment of this disclosure. In step 1 and step 2 shown in FIG. 3, a management node obtains service requirement information through prediction based on historical access information of a computing node. For example, the management node determines, at 12:00 noon, whether burst access occurs from 00:00 to 12:00 on the next day. Specifically, the management node predicts a burst access moment, a burst access bandwidth W, and burst access duration T that are in the period of time from 00:00 to 12:00 on the next day based on a status of access of the computing node to a storage node from 00:00 to 12:00 in a latest week.

202: The management node determines target configuration information based on the service requirement information, where the target configuration information is used to configure a peak bandwidth and peak bandwidth duration that are of the storage node.

The management node determines the target configuration information based on the service requirement information. The target configuration information includes one or more of the following: a GC waterline level, a power consumption level, and a voltage level. Specifically, the management node determines, from a configuration table based on the service requirement information, a target peak bandwidth and target peak bandwidth duration that correspond to the service requirement information, and selects a GC waterline level, a power consumption level, or a voltage level corresponding to the target peak bandwidth and the target peak bandwidth duration as the target configuration information.

It should be noted that in this embodiment of this disclosure, the storage node includes one or more SSDs. The target configuration information sent by the management node to the storage node is used to indicate a GC waterline level, a power consumption level, and a voltage level of the one or more SSDs in the storage node.

Table 1 is a configuration table provided in this embodiment of this disclosure. As shown in Table 1, in an example in Table 1, the configuration table includes a GC waterline level, a power consumption level, a write voltage level, a peak write bandwidth, peak write bandwidth duration, or preparation time. It can be learned from Table 1 that a higher peak write bandwidth of the storage node indicates longer preparation time needed by the storage node, and longer peak write bandwidth duration of the storage node also indicates longer preparation time needed by the storage node. The storage node performs garbage collection in advance, adjusts a working mode of the storage node, or migrates data inside the storage node within the preparation time.

As shown in Table 1, the GC waterline level of the storage node includes three levels 0, 1, and 2, and the power consumption level and the write voltage level each include two levels 0 and 1. A higher GC waterline level indicates a higher access bandwidth released by the storage node by performing garbage collection in advance. A higher power consumption level indicates a higher power consumption threshold of the storage node. For example, when the power consumption level is 0, the power consumption threshold of the storage node is 25 W, and when the power consumption level is 1, the power consumption threshold of the storage node is 40 W. A higher write voltage level indicates a higher write voltage threshold of the storage node.

In this embodiment of this disclosure, the configuration table may be provided for the computing node in a manner of a user manual, to help a user or a cloud vendor query for preparation time.

TABLE 1

| SSD state | GC waterline level | Power consumption level | Write voltage level | Peak write bandwidth | Duration | Preparation time |
|---|---|---|---|---|---|---|
| State 1 | 0 | 0 | 0 | 800 MB/s | 0 | 0 |
| State 2 | 1 | 0 | 0 | 4500 MB/s | 90 s | 3600 s |
| State 3 | 2 | 0 | 0 | 4500 MB/s | 180 s | 7200 s |
| State 4 | 0 | 1 | 0 | 1000 MB/s | 0 | 60 s |
| State 5 | 1 | 1 | 0 | 6000 MB/s | 70 s | 3600 s |
| State 6 | 2 | 1 | 0 | 6000 MB/s | 140 s | 7200 s |
| State 7 | 0 | 0 | 1 | 1200 MB/s | 0 | 3600 s |
| State 8 | 1 | 0 | 1 | 6700 MB/s | 90 s | 7200 s |
| State 9 | 2 | 0 | 1 | 6700 MB/s | 180 s | 10800 s |
| State 10 | 0 | 1 | 1 | 1500 MB/s | 0 | 3660 s |
| State 11 | 1 | 1 | 1 | 9000 MB/s | 70 s | 7200 s |
| State 12 | 2 | 1 | 1 | 9000 MB/s | 140 s | 10800 s |

In an example of burst write, the management node determines an appropriate peak write bandwidth and peak write bandwidth duration in the configuration table based on a burst write bandwidth and burst write bandwidth duration that are in the service requirement information, and uses a GC waterline level, a power consumption level, or a write voltage level that corresponds to the peak write bandwidth and the peak write bandwidth duration as the target configuration information.

The following describes a process in which the management node determines the target configuration information in the configuration table according to an embodiment of this disclosure.

Figure 4:
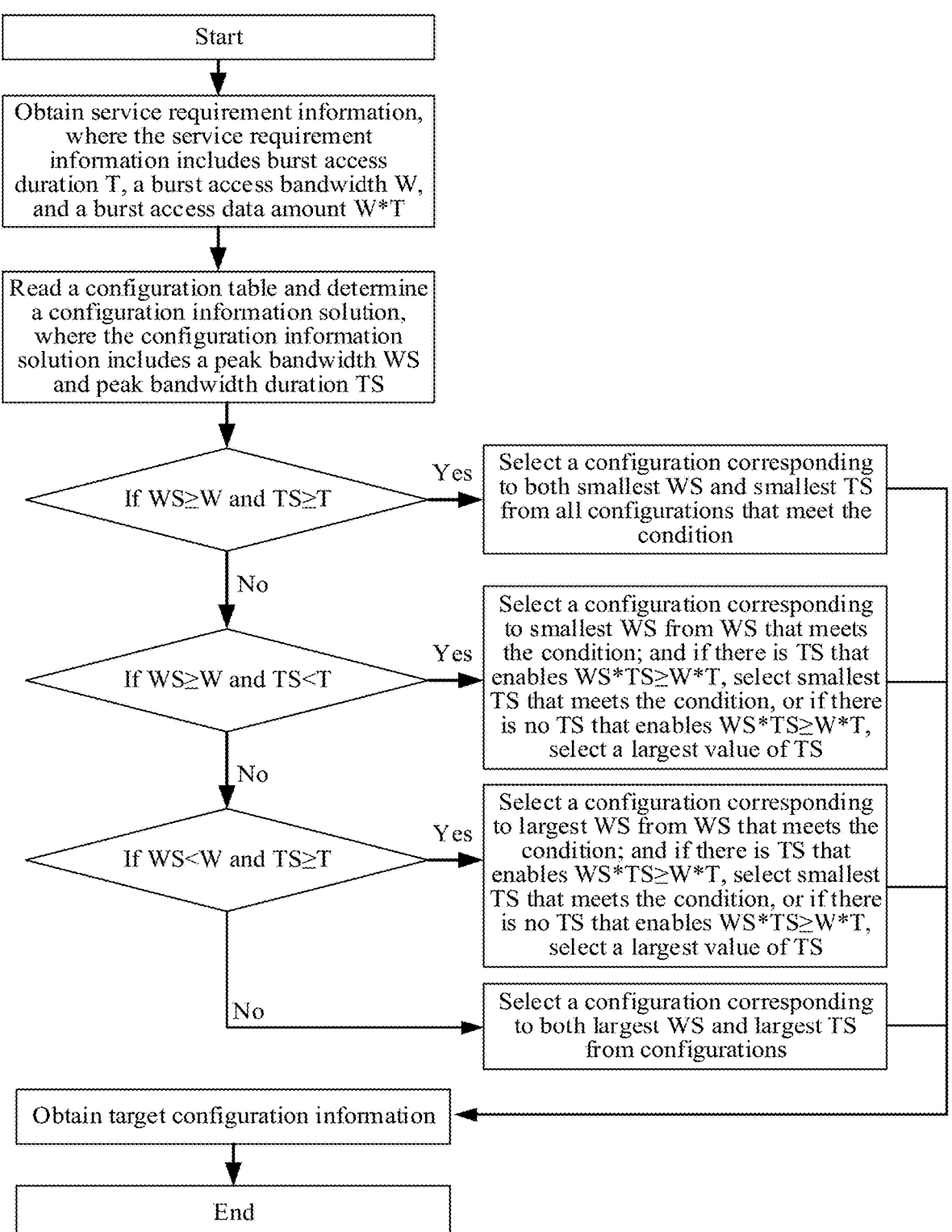
FIG. 4 is a diagram of another storage node configuration method according to an embodiment of this disclosure.

FIG. 4 is a diagram of determining target configuration information according to an embodiment of this disclosure. As shown in FIG. 4, after obtaining the service requirement information, the management node reads a peak bandwidth and peak bandwidth duration in the configuration table. It is assumed that in the service requirement information, the burst access bandwidth is W, the burst access duration is T, the peak bandwidth read from the configuration table is WS, and the peak bandwidth duration is TS.

As shown in FIG. 4, if all WS and TS in the configuration table meet WS≥W and TS≥T, a configuration corresponding to both smallest WS and smallest TS in all WS and TS that meet the condition is selected as the target configuration information.

As shown in FIG. 4, if there are WS and TS in the configuration table that meet WS≥W and TS<T, a configuration corresponding to smallest WS is selected from all configurations that meet the condition. If there is TS that enables WS*TS≥W*T, a configuration corresponding to smallest TS is selected from configurations that meet the condition. If there is no TS that enables WS*T≥W*T, a configuration corresponding to largest TS is selected.

As shown in FIG. 4, if there are WS and TS in the configuration table that meet WS<W and TS≥T, a configuration corresponding to largest WS is selected from all configurations that meet the condition. If there is TS that enables WS*TS≥W*T, a configuration corresponding to smallest TS is selected from configurations that meet the condition. If there is no TS that enables WS*TS≥W*T, a configuration corresponding to largest TS is selected.

As shown in FIG. 4, if all WS and TS in the configuration table meet WS<W and TS<T, a configuration corresponding to both largest WS and largest TS is selected as the target configuration information.

In an example shown in FIG. 4, it is assumed that the burst access bandwidth W is 5500 MB/s, and the burst access duration T is 200 s. The management node determines the target configuration information from the configuration table. For example, the configuration table is Table 1. There may be configurations that meet WS≥W and TS<T in Table 1. Configurations that meet the peak bandwidth WS≥W include the state 5, the state 6, the state 8, the state 9, the state 11, and the state 12. In these configurations, configurations that meet WS*TS≥W*T include the state 9 and the state 12. WS in the state 9 is less than WS in the state 12. Therefore, a configuration corresponding to the state 9 is selected as the target configuration information.

Still refer to FIG. 3. In step 3 shown in FIG. 3, the management node determines target configuration information based on the service requirement information. For example, the service requirement information indicates that the burst access moment is 12:00 noon, the burst write bandwidth is 5000 MB/s, and the duration is 60 s. The management node queries the configuration table for a peak write bandwidth and peak write bandwidth duration. For example, the configuration table is Table 1. In all states of the SSD, there are six options in which the peak write bandwidth is greater than or equal to 5000 MB/s and the peak write bandwidth duration is greater than or equal to 60 s: the state 5, the state 6, the state 8, the state 9, the state 11, and the state 12. Among the six options, the state 5 has a smallest amount of data. The amount of data is a product of the peak write bandwidth and the peak write bandwidth duration. Therefore, the management node uses a GC waterline level, a power consumption level, or a voltage level that corresponds to the state 5 as the target configuration information.

203: The management node sends the target configuration information to the storage node.

The management node sends the target configuration information to the storage node. Specifically, the management node sends one or more of the following information in the target configuration information to the storage node through an SSD peak performance configuration interface: the GC waterline level, the power consumption level, or the voltage level.

In this embodiment of this disclosure, the storage node may enter a preparation state after receiving the target configuration information sent by the management node. Alternatively, the storage node enters a preparation state after receiving a preparation instruction sent by the management node. This is not limited. The storage node in the preparation state starts timing of preparation time.

Still refer to FIG. 3. In step 4 shown in FIG. 3, the management node sends the target configuration information to the storage node. For example, the target configuration information is the GC waterline level, the power consumption level, or a voltage level that corresponds to the state 5 in Table 1. The management node sends a configuration corresponding to the state 5 to the storage node. After the storage node receives the configuration corresponding to the state 5 in Table 1, because preparation time needed for entering the state 5 is 3600 s, the storage node needs to enter a preparation state of the state 5 at least 3600 s in advance.

In the example shown in FIG. 3, for example, the storage node enters the preparation state after receiving the preparation instruction sent by the management node. It is assumed that the burst access moment is 12:00. At 10:30, the management node sends the preparation instruction for entering the state 5 to the storage node.

This embodiment of this disclosure provides a storage node whose peak bandwidth is configurable. In addition, the storage node provides an SSD peak performance configuration interface, so that the management node invokes the SSD peak performance configuration interface based on the target configuration information to change a stored peak write bandwidth.

204: The storage node configures the storage node based on the target configuration information.

That the storage node configures the storage node based on the target configuration information includes configuring the GC waterline level, the power consumption level, and the voltage level of the storage node. The several storage node configuration methods may be asynchronous configuration, or may be synchronously superimposed configuration. This is not limited. The following describes the several configuration methods in detail.

In a process in which the storage node configures the GC waterline level of the storage node based on the target configuration information, the storage node starts garbage collection in advance within the preparation time, so that the garbage collection does not occupy an access bandwidth after burst access time arrives. Specifically, the storage node reserves a part of blank blocks to absorb burst load, and an amount of data for absorbing the burst load is determined by the GC waterline level. The blank block refers to storage space in which no data is stored. A block is a unit of data storage and processing. When the burst load arrives, the blank block can absorb a burst write bandwidth at a speed close to a normal write bandwidth until space consumption of the blank block is completed. A sequential write bandwidth is, for example, 4.5 GB/s.

In a process in which the storage node configures the power consumption level of the storage node based on the target configuration information, the storage node increases the power consumption level of the storage node based on the target configuration information, so that the storage node breaks through a power consumption limit in short time, to increase a peak bandwidth of the storage node to absorb the burst access bandwidth in short time. For example, a power consumption threshold of an SSD in the storage node in a normal state is 25 W. The storage node increases the power consumption threshold of the SSD to 40 W based on the target configuration information. A write bandwidth of the SSD in the storage node is fully released, and the write bandwidth of the storage node can be increased from 4.5 GB/s to 6 GB/s.

In a process in which the storage node configures the voltage level of the storage node based on the target configuration information, a write voltage is used as an example. The storage node may adjust a write voltage threshold of a flash memory chip of the SSD. When write voltage threshold is higher, a write voltage step is higher; and therefore the SSD in the storage node reaches a specified state in fewer steps, and a write bandwidth is higher. For example, a voltage level 0 indicates a normal write voltage level, and a voltage level 1 indicates a high write voltage level. In comparison with the normal write voltage level, the write bandwidth can be increased by 50% at the high write voltage level.

In this embodiment of this disclosure, after the storage node completes configuration of the storage node based on the target configuration information, when burst access of the computing node to the storage node arrives, the management node sends a query instruction to the storage node. The query instruction is used to query whether the storage node reaches a preparation completion moment, this means, query whether timing of preparation time of the storage node is completed. If the preparation timing is completed, the management node determines that preparation of the storage node is completed. Specifically, the storage node may send a query instruction response to the management node. The query instruction response indicates a preparation state of the storage node to the management node.

After the management node determines that the storage node reaches the preparation completion moment, the management node sends an acceleration state command to the storage node. The acceleration state command is used to set the storage node to start an acceleration state. After acceleration starts, an access bandwidth of the storage node reaches the peak bandwidth. The management node monitors the access bandwidth of the storage node in real time. When the burst access bandwidth of the storage node ends or the peak bandwidth duration has elapsed, the management node sends an acceleration state exit command to the storage node. After the storage node receives the acceleration state exit command, a bandwidth of the storage node is restored from the peak bandwidth to a normal bandwidth.

Still refer to FIG. 3. In step 5 to step 10 shown in FIG. 3, after the storage node receives the target configuration information sent by the management node, the storage node enters a preparation state. When the burst access moment is reached, the management node sends a query instruction to the storage node, to query whether preparation of the storage node is completed. If the preparation of the storage node is completed, the management node sends an acceleration state command to the storage node. If the preparation is not completed, the storage node is not successfully configured based on the target configuration information, and the storage node does not have a peak adjustment capability.

In the example shown in FIG. 3, the management node continuously monitors the access bandwidth of the storage node. If the burst access ends or the peak bandwidth duration has elapsed, the management node sends an acceleration state exit command to the storage node, so that the bandwidth of the storage node is restored from the peak bandwidth to the normal bandwidth.

Figure 5:
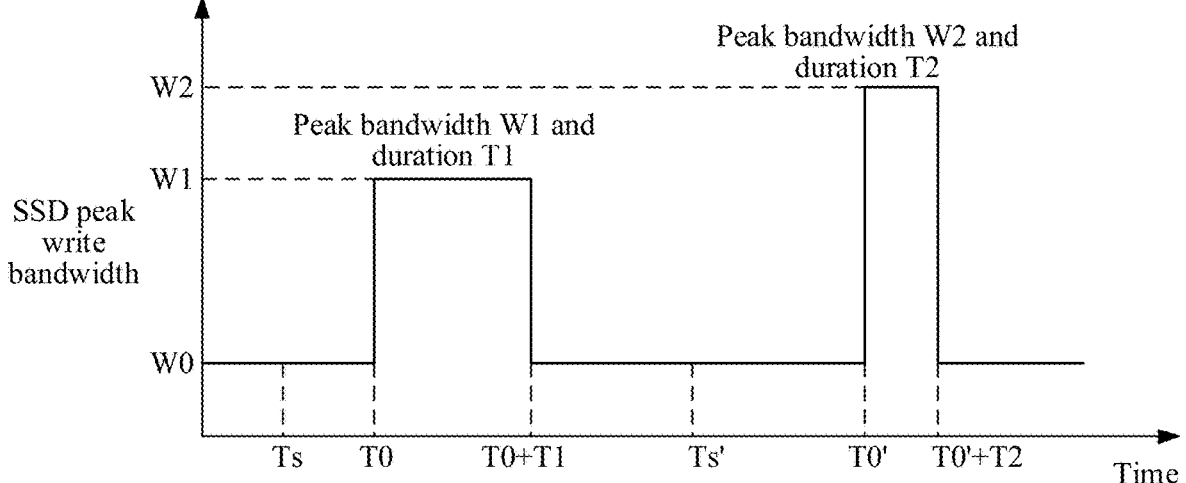
FIG. 5 is a diagram of a change of a peak bandwidth of a storage node according to an embodiment of this disclosure.

FIG. 5 is a diagram of a change of a peak write bandwidth of a storage node according to an embodiment of this disclosure. As shown in FIG. 5, after the peak write bandwidth of the storage node is successfully configured based on target configuration information, after the storage node receives an acceleration state command, a peak bandwidth of the storage node is increased. After the storage node receives an acceleration state exit command, the peak bandwidth of the storage node is reduced to a normal value of the peak bandwidth.

As shown in FIG. 5, a regular peak write bandwidth value of an SSD in the storage node is W0. Target configuration information is sent at a moment Ts, and a peak write bandwidth of the SSD is configured as W1 based on the target configuration information and lasts for time T1. Preparation time corresponding to the W1 and the T1 is (T0–Ts). After the preparation time (T0–Ts) elapses, at a moment T0, the peak write bandwidth of the SSD reaches W1 and may last for the time T1. At a moment Ts', the peak write bandwidth of the SSD is configured as W2, and lasts for time T2. Preparation time corresponding to the W2 and the T2 is (T0'–Ts'). After the preparation time (T0'–Ts') elapses, the peak write bandwidth of the SSD reaches W2 and lasts for the time T2.

In this embodiment of this disclosure, the management node can obtain a service access requirement of the computing node, and determine configuration information of the storage node based on the service access requirement, so that the storage node can absorb a burst access bandwidth when the burst access moment is reached. In this way, a capability of coping with the burst access by the storage node is improved. In addition, no new storage medium is added to the storage node to absorb the burst access bandwidth, so that costs of coping with the burst access by the storage node are reduced, and storage resources are saved.

The foregoing describes the storage node configuration method provided in embodiments of this disclosure. The following describes a configuration apparatus in embodiments of this disclosure with reference to the accompanying drawings.

Figure 6:
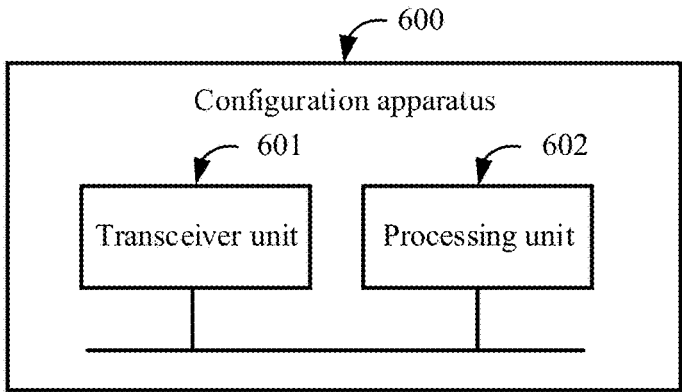
FIG. 6 is a diagram of a structure of a configuration apparatus according to an embodiment of this disclosure.

FIG. 6 is a diagram of a structure of a configuration apparatus according to an embodiment of this disclosure. The apparatus is configured to implement steps performed by the management node or the storage node in the foregoing embodiments. As shown in FIG. 6, the configuration apparatus 600 includes a transceiver unit 601 and a processing unit 602.

In an embodiment of this disclosure, the configuration apparatus 600 is configured to implement the method performed by the management node in the foregoing method embodiments. In other words, the management node may include the transceiver unit 601 and the processing unit 602.

The transceiver unit 601 is configured to obtain service requirement information. The service requirement information includes a burst access moment, a burst access bandwidth, or burst access duration of a computing node for a storage node. The processing unit 602 is configured to determine target configuration information based on the service requirement information. The target configuration information is used to configure a peak bandwidth and peak bandwidth duration that are of the storage node. The transceiver unit is further configured to send the target configuration information to the storage node.

In a possible implementation, the target configuration information includes one or more of the following information: a GC waterline level, a power consumption level, and a voltage level. A garbage collection waterline indicates an amount of data on which garbage collection is performed.

In a possible implementation, the transceiver unit 601 is configured to receive the service requirement information sent by the computing node. Alternatively, the processing unit is further configured to determine a prediction value of the service requirement information based on historical access information of the computing node for the storage node.

In a possible implementation, the transceiver unit 601 is further configured to send a query instruction to the storage node when the burst access moment is reached. The query instruction is used to query whether the storage node reaches a preparation completion moment, the preparation completion moment is determined based on the burst access moment and preparation time, and the preparation time is time needed for an access bandwidth of the storage node to reach the peak bandwidth. The transceiver unit 601 is further configured to send an acceleration state command to the storage node when the storage node reaches the preparation completion moment. The acceleration state command is used to enable the peak bandwidth on the storage node.

In a possible implementation, the processing unit 602 is further configured to monitor the access bandwidth of the storage node. The transceiver unit 601 is further configured to send an acceleration state exit command to the storage node when the access bandwidth is less than a threshold or the peak bandwidth duration is reached. The acceleration state exit command is used to restore the peak bandwidth to a normal bandwidth on the storage node.

In a possible implementation, the processing unit 602 is configured to determine a target peak bandwidth and target peak bandwidth duration from a configuration table based on the service requirement information. The configuration table includes peak bandwidths, peak bandwidth duration, or preparation time that corresponds to different configurations of the storage node. The processing unit 602 is configured to determine the target configuration information based on the target peak bandwidth and the target peak bandwidth duration.

In another embodiment of this disclosure, the configuration apparatus 600 is configured to implement the method performed by the storage node in the foregoing method embodiments. In other words, the storage node may include the transceiver unit 601 and the processing unit 602.

The transceiver unit 601 is configured to receive target configuration information sent by a management node. The target configuration information is used to configure a peak bandwidth and peak bandwidth duration that are of the storage node. The processing unit 602 is adapted to configure the storage node based on the target configuration information, to enable the storage node to process burst access of a computing node to the storage node.

In a possible implementation, the target configuration information includes one or more of the following information: a GC waterline level, a power consumption level, and a voltage level. A garbage collection waterline indicates an amount of data on which garbage collection is performed.

In a possible implementation, the transceiver unit 601 is further configured to receive an acceleration state command sent by the management node. The acceleration state command is used to enable the peak bandwidth on the storage node.

In a possible implementation, the processing unit 602 is adapted to configure a GC waterline level of an SSD in the storage node based on the target configuration information, and increase a bandwidth that is used by the storage node to perform garbage processing before a burst access moment.

In a possible implementation, the processing unit 602 is adapted to configure a power consumption level of the SSD in the storage node based on the target configuration information, to enable a power consumption threshold of the storage node to increase, thereby increasing a bandwidth of the storage node.

In a possible implementation, the processing unit 602 is adapted to configure a voltage level of the SSD in the storage node based on the target configuration information, to enable a voltage threshold of the storage node to increase, thereby increasing the bandwidth of the storage node.

It should be understood that division of the units in the foregoing apparatus is merely logical function division. During actual implementation, all or some of the units may be integrated into one physical entity, or may be physically separated. In addition, all the units in the apparatus may be implemented in a form of software invoked by a processing element, or may be implemented in a form of hardware; or some units may be implemented in a form of software invoked by a processing element, and some units may be implemented in a form of hardware. For example, each unit may be a separately disposed processing element, or may be integrated into a chip of the apparatus for implementation. In addition, each unit may alternatively be stored in a memory in a form of a program to be invoked by a processing element of the apparatus to perform a function of the unit. In addition, all or some of the units may be integrated, or may be implemented independently. The processing element herein may also be referred to as a processor, and may be an integrated circuit having a signal processing capability. During implementation, steps in the foregoing methods or the foregoing units may be implemented by using a hardware integrated logic circuit in a processor element, or may be implemented in the form of software invoked by the processing element.

It should be noted that, for ease of description, the foregoing method embodiments are described as a series of action combinations. However, a person skilled in the art should understand that this disclosure is not limited by the described action sequence. In addition, a person skilled in the art should also understand that embodiments described in this specification are all example embodiments, and the actions mentioned are not necessarily required for this disclosure.

Another appropriate step combination that can be figured out by a person skilled in the art according to the content described above also falls within the protection scope of this disclosure. In addition, a person skilled in the art should also be familiar to embodiments described in this specification all belong to example embodiments, and involved actions are not necessarily mandatory in this disclosure.

Figure 7:
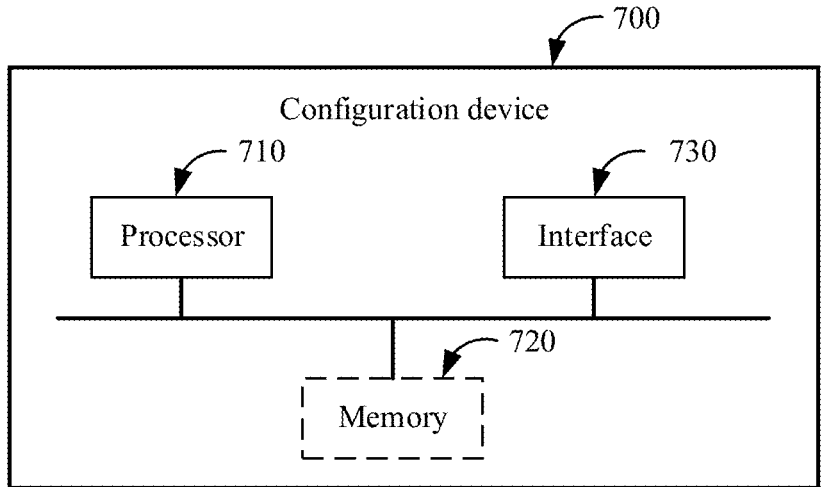
FIG. 7 is a diagram of a structure of a configuration device according to an embodiment of this disclosure.

FIG. 7 is a diagram of a structure of a configuration device according to an embodiment of this disclosure. As shown in FIG. 7, the configuration device 700 includes a processor 710, a memory 720, and an interface 730. The processor 710, the memory 720, and the interface 730 are coupled through a bus (not marked in the figure). The memory 720 stores instructions. When the execution instructions in the memory 720 are executed, the configuration device 700 performs the method performed by the management node or the storage node in the foregoing method embodiments.

The configuration device 700 may be one or more integrated circuits configured to implement the foregoing methods, for example, one or more application integrated circuits (ASICs), or one or more microprocessors (DSPs), or one or more field-programmable gate arrays (FPGAs), or a combination of at least two of these forms of integrated circuits. For another example, when the unit in the apparatus is implemented in a form of scheduling a program by the processing element, the processing element may be a general-purpose processor, for example, a central processing unit (CPU) or another processor that may invoke the program. For still another example, the units may be integrated and implemented in a form of a system-on-a-chip (SoC).

The processor 710 may be a CPU, or may be another general-purpose processor, a DSP, an ASIC, a FPGA or another programmable logic device, a transistor logic device, a hardware component, or any combination thereof. The general-purpose processor may be a microprocessor or any regular processor.

The memory 720 may include a read-only memory and a random-access memory (RAM), and provides instructions and data for the processor 710. The memory 720 may further include a nonvolatile RAM. For example, the memory 720 may be provided with a plurality of partitions, and each partition is configured to store private keys of different software modules.

The memory 720 may be a volatile memory or a non-volatile memory, or may include both a volatile memory and a nonvolatile memory. The nonvolatile memory may be a read-only memory (ROM), a programmable ROM (PROM), an erasable programmable read-only memory EPROM), an electrically erasable programmable read-only memory (EE-PROM), or a flash memory. The volatile memory may be a RAM, used as an external cache. Through an example but not limitative description, many forms of RAMs may be used, for example, a static RAM (SRAM), a DRAM, a synchronous dynamic RAM (SDRAM), a double data rate synchronous dynamic RAM DDR SDRAM), an enhanced synchronous dynamic RAM (ESDRAM), a synchlink dynamic RAM SLDRAM), and a direct rambus RAM (DR RAM).

In addition to a data bus, the bus may further include a power bus, a control bus, a status signal bus, and the like. The bus may be a Peripheral Component Interconnect Express (PCIe) bus, an extended industry standard architecture (EISA) bus, a unified bus (Ubus or UB), a computer express link (CXL) bus, a cache coherent interconnect for accelerators (CCIX) bus, or the like. The bus may be classified into an address bus, a data bus, a control bus, and the like.

Figure 8:
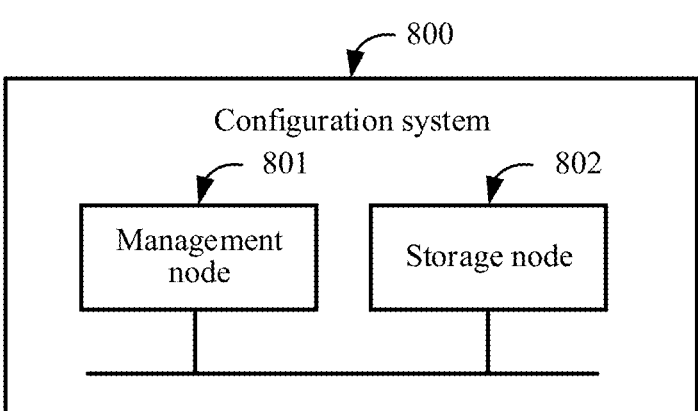
FIG. 8 is a diagram of a structure of a configuration system according to an embodiment of this disclosure.

FIG. 8 is a diagram of a configuration system according to an embodiment of this disclosure. The configuration system 800 includes a management node 801 and a storage node 802. The management node 801 may be the management node in the foregoing method embodiments. The storage node 802 may be the storage node in the foregoing method embodiments.

In another embodiment of this disclosure, a computer-readable storage medium is further provided. The computer-readable storage medium stores computer-executable instructions. When a processor of a device executes the computer-executable instructions, the device performs the method performed by the management node or the storage node in the foregoing method embodiments.

In another embodiment of this disclosure, a computer program product is further provided. The computer program product includes computer-executable instructions, and the computer-executable instructions are stored in a computer-readable storage medium. When a processor of a device executes the computer-executable instructions, the device performs the method performed by the management node or the storage node in the foregoing method embodiments.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In several embodiments provided in this disclosure, it should be understood that the disclosed system, apparatus, and method may be implemented in other manners. For example, the described apparatus embodiment is merely an example. For example, division into the units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate components may or may not be physically separate, and components displayed as units may or may not be physical units, may be located at one position, or may be distributed on a plurality of network units. Some or all of the units may be selected based on actual requirements to achieve the objectives of the solutions of embodiments.

In addition, functional units in embodiments of this disclosure may be integrated into one processing unit, each of the units may exist alone physically, or two or more units are integrated into one unit. The integrated unit may be implemented in a form of hardware, or may be implemented in a form of a software functional unit.

When the integrated unit is implemented in the form of the software functional unit and sold or used as an independent product, the integrated unit may be stored in a computer-readable storage medium. Based on such an understanding, the technical solutions may be implemented in the form of a software product. The computer software product is stored in a storage medium and includes several instructions for instructing a computer device (which may be a personal computer, a server, a network device, or the like) to perform all or some of the steps of the methods described in embodiments of this disclosure. The foregoing storage medium includes any medium that can store program code, such as a USB flash drive, a removable hard disk, a ROM, a RAM, a magnetic disk, or an optical disc.

What is claimed is:

1. A method implemented by a management node in a distributed storage system, the method comprising:

obtaining service requirement information, wherein the service requirement information comprises a burst access moment, a burst access bandwidth, or a burst access duration of a computing node for a storage node;

determining target configuration information based on the service requirement information, wherein the target configuration information configures a power consumption level of a solid-state drive (SSD) in the storage node to enable the storage node to exceed a power consumption threshold to increase a peak bandwidth of the storage node; and sending the target configuration information to the storage node.

2. The method according to claim 1, wherein the target configuration information comprises a garbage collection (GC) waterline level indicating an amount of data on which GC is performed.

3. The method according to claim 1, wherein obtaining the service requirement information comprises:

receiving the service requirement information from the computing node; or determining a prediction value of the service requirement information based on historical access information of the computing node.

4. The method according to claim 1, wherein after sending the target configuration information to the storage node, the method further comprises:

sending a query instruction to the storage node when the burst access moment is reached, wherein the query instruction queries whether the storage node reaches a preparation completion moment, wherein the preparation completion moment is based on the burst access moment and preparation time, and wherein the preparation time is for an access bandwidth of the storage node to reach the peak bandwidth; and sending an acceleration state command to the storage node when the storage node reaches the preparation completion moment, wherein the acceleration state command enables the peak bandwidth on the storage node.

5. The method according to claim 4, wherein after sending the acceleration state command to the storage node, the method further comprises:

monitoring the access bandwidth of the storage node; and sending an acceleration state exit command to the storage node when the access bandwidth is less than a threshold or when a peak bandwidth duration is reached, wherein the acceleration state exit command allows restoring the peak bandwidth to a normal bandwidth on the storage node.

6. The method according to claim 1, wherein determining the target configuration information based on the service requirement information comprises:

determining, based on the service requirement information, a target peak bandwidth and a target peak bandwidth duration from a configuration table, wherein the configuration table comprises peak bandwidths, a peak bandwidth duration, or a preparation time that corresponds to different configurations of the storage node; and further determining the target configuration information based on the target peak bandwidth and the target peak bandwidth duration.

7. The method according to claim 1, further comprising:

receiving the target configuration information; and configuring the storage node based on the target configuration information to enable the storage node to process burst access of the computing node.

8. The method according to claim 7, wherein the target configuration information comprises a garbage collection (GC) waterline level or a voltage level, and wherein the GC waterline level indicates an amount of data on which garbage collection is performed.

9. The method according to claim 7, further comprising receiving an acceleration state command, wherein the acceleration state command enables the peak bandwidth on the storage node.

10. The method according to claim 7, wherein configuring the storage node based on the target configuration information comprises:

configuring a garbage collection (GC) waterline level of the SSD in the storage node based on the target configuration information; and increasing a bandwidth of the storage node to enable the storage node to perform garbage processing before the burst access moment.

11. The method according to claim 7, wherein the target configuration information comprises a voltage level.

12. The method according to claim 7, wherein configuring the storage node based on the target configuration information comprises configuring a voltage level of the SSD based on the target configuration information to enable a voltage threshold of the storage node to increase and enable a bandwidth of the storage node.

13. A management node in a distributed storage system, comprising:

a memory configured to store instructions; and one or more processors coupled to the memory and configured to invoke the instructions to cause the management node to:

obtain service requirement information, wherein the service requirement information comprises a burst access moment, a burst access bandwidth, or burst access duration of a computing node for a storage node;

determine target configuration information based on the service requirement information, wherein the target configuration information configures a power consumption level of a solid-state drive (SSD) in the storage node to enable the storage node to exceed a power consumption threshold to increase a peak bandwidth of the storage node; and send the target configuration information to the storage node.

14. The management node according to claim 13, wherein the target configuration information comprises a garbage collection (GC) waterline level or a voltage level, and wherein a GC waterline level indicates an amount of data on which garbage collection is performed.

15. The management node according to claim 13, wherein the one or more processors are further configured to execute the instructions to cause the management node to:

receive the service requirement information from the computing node; or determine a prediction value of the service requirement information based on historical access information of the computing node.

16. The management node according to claim 13, wherein the one or more processors are further configured to execute the instructions to cause the management node to:

send a query instruction to the storage node when the burst access moment is reached, wherein the query instruction queries whether the storage node reaches a preparation completion moment, wherein the preparation completion moment is based on the burst access moment and preparation time, and wherein the preparation time is for an access bandwidth of the storage node to reach the peak bandwidth; and send an acceleration state command to the storage node when the storage node reaches the preparation completion moment, wherein the acceleration state command is used to enable the peak bandwidth on the storage node.

17. The management node according to claim 16, wherein the one or more processors are further configured to execute the instructions to cause the management node to:

monitor the access bandwidth of the storage node; and send an acceleration state exit command to the storage node when the access bandwidth is less than a threshold or when a peak bandwidth duration is reached, wherein the acceleration state exit command allows restoring the peak bandwidth to a normal bandwidth on the storage node.

18. The management node according to claim 13, wherein the one or more processors are further configured to execute the instructions to cause the management node to:

determine, based on the service requirement information, a target peak bandwidth and a target peak bandwidth duration from a configuration table, wherein the configuration table comprises peak bandwidths, a peak bandwidth duration, or a preparation time that corresponds to different configurations of the storage node; and further determine the target configuration information is based on the target peak bandwidth and the target peak bandwidth duration.

19. The management node according to claim 13, wherein the one or more processors are further configured to execute the instructions to cause the management node to:

receive the target configuration information; and configure the storage node based on the target configuration information to enable the storage node to process burst access of the computing node to the storage node.

20. A computer program product comprising computer-executable instructions stored on a non-transitory computer-readable medium that, when executed by one or more processors, cause a management node in a distributed storage system to:

obtain service requirement information, wherein the service requirement information comprises a burst access moment, a burst access bandwidth, or burst access duration of a computing node for a storage node;

determine target configuration information based on the service requirement information, wherein the target configuration information configures a power consumption level of a solid-state drive (SSD) in the storage node to enable the storage node to exceed a power consumption threshold to increase a peak bandwidth of the storage node; and send the target configuration information to the storage node.

* * * * *